United States Patent [19]

Fasching et al.

[11] Patent Number: 5,337,289
[45] Date of Patent: Aug. 9, 1994

[54] PHASED-ARRAY ULTRASONIC SURFACE CONTOUR MAPPING SYSTEM AND METHOD FOR SOLIDS HOPPERS AND THE LIKE

[75] Inventors: George E. Fasching; Nelson S. Smith, Jr., both of Morgantown, W. Va.

[73] Assignee: The United States of America as represented by the Department of Energy, Washington, D.C.

[21] Appl. No.: 92,107

[22] Filed: Jul. 16, 1993

[51] Int. Cl.$^5$ .............................................. H04R 17/00
[52] U.S. Cl. ..................... 367/140; 367/908; 340/612; 340/617; 340/621; 73/620; 73/621; 73/625
[58] Field of Search ................. 367/908, 140; 340/612, 340/617, 621; 73/618, 620, 621, 625, 628

[56] References Cited

U.S. PATENT DOCUMENTS

| | | | |
|---|---|---|---|
| 4,110,617 | 8/1978 | Legille | 250/342 |
| 4,288,866 | 9/1981 | Sackman | 367/11 |
| 4,503,708 | 3/1985 | Kino et al. | 73/628 |
| 4,694,700 | 9/1987 | Maerfeld | 73/628 |
| 4,881,177 | 11/1989 | McClean et al. | 364/513 |
| 4,949,310 | 8/1990 | Smith et al. | 367/7 |
| 4,991,427 | 2/1991 | Nottingham et al. | 73/623 |
| 5,050,226 | 9/1991 | Collet-Billon | 382/54 |
| 5,246,006 | 9/1993 | Kanda et al. | 128/661.09 |

OTHER PUBLICATIONS

Schoenwald et al., "Acoustic Range Sensing Servo Control; Improved Robot Positioning and Trajectory", IEEE, vol. UFFC-34, No. 2 Mar. 1987.
Morgera, "Signal Processing for Precise Ocean Mapping" Ocean '73 IEEE Int. Conf on Eng. in Ocean Envir. pp. 118-123, IEEE NY 73.
Redding, "Contour Plotting by A Sonic Phase Lock Loop," Acoustic Imaging, vol. 10, pp. 143-149, Plenum, NY 1982.
Denbigh, "Sterescopic Visulisation and Contour Mapping of the Sea Bed Using B255", IERE London, UK 1981, pp. 191-311.
DiStefano, et al., "Acoustic Contour Mapping", IBM Technical Disclosure Bulletin, vol. 25, No. 10, pp. 5106-5108, Mar. 1983.

Primary Examiner—J. Woodrow Eldred
Attorney, Agent, or Firm—David E. Breeden; Stephen D. Hamel; William R. Moser

[57] ABSTRACT

A real time ultrasonic surface contour mapping system is provided including a digitally controlled phased-array of transmitter/receiver (T/R) elements located in a fixed position above the surface to be mapped. The surface is divided into a predetermined number of pixels which are separately scanned by an arrangement of T/R elements by applying phase delayed signals thereto that produce ultrasonic tone bursts from each T/R that arrive at a point X in phase and at the same time relative to the leading edge of the tone burst pulse so that the acoustic energies from each T/R combine in a reinforcing manner at point X. The signals produced by the reception of the echo signals reflected from point X back to the T/Rs are also delayed appropriately so that they add in phase at the input of a signal combiner. This combined signal is then processed to determine the range to the point X using density-corrected sound velocity values. An autofocusing signal is developed from the computed average range for a complete scan of the surface pixels. A surface contour map is generated in real time form the range signals on a video monitor.

12 Claims, 12 Drawing Sheets

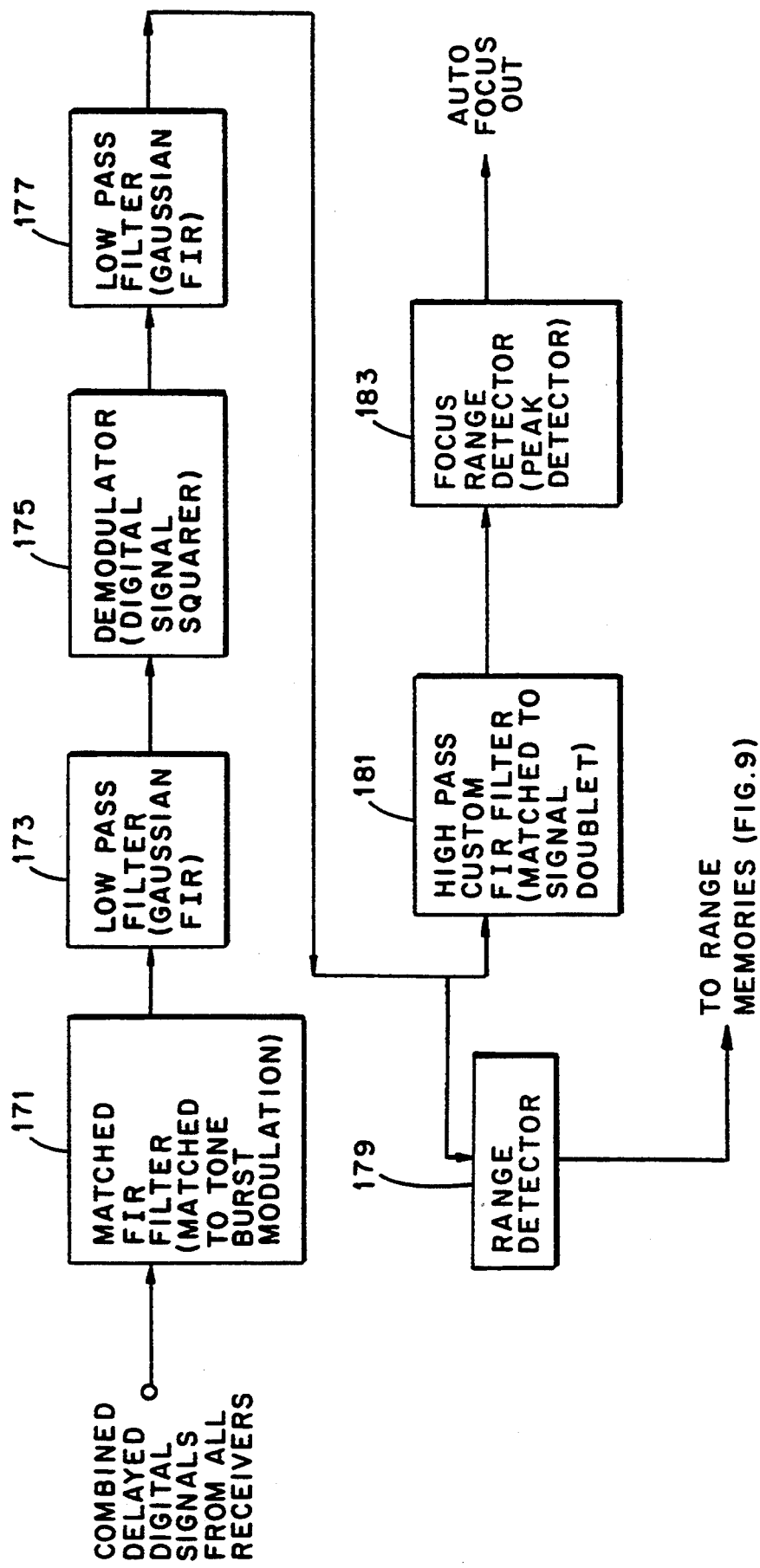

PHASED-ARRAY ULTRASONIC SURFACE CONTOUR MAPPING SYSTEM AND METHOD FOR SOLIDS HOPPERS AND THE LIKE

The United States Government has rights in this invention pursuant to the employer-employee relationship of the U.S. Department of Energy and the inventors. This invention relates generally to devices and methods for noncontact surface contour mapping and more specifically to systems and methods for dynamic surface contour mapping of solids contained in a hopper or the like.

BACKGROUND OF THE INVENTION

In the development of reliable mechanistic models for prediction of solids flow behavior in silos or other solids handling and storage components and in systems such as coal handling and combustion facilities, knowledge of the solids flow characteristics can be gained from dynamic measurement of the top surface contour. The behavior of bulk materials stored in hoppers and silos and while being transferred into or out of storage in such vessels is of interest in optimizing the materials handling process. Further, the behavior of materials in dynamic processing systems such as combustors and fluidized beds is important to those involved in the design, development, or operation of such systems. Such materials behavior has been studied using probes to measure density, particle velocities, circulation patterns, and other parameters within the bed of materials. In addition to these parameters, mapping of the surface contour of the bed of materials under both static and dynamic conditions would be of considerable value. Knowledge of surface contour would be useful under static conditions for purposes such as materials inventory. Under dynamic conditions, control of the filling and emptying of hoppers, the fueling and ash removal processes for combustion/gasification vessels, and the monitoring and control of fluidized beds requires knowledge of the surface contour in order to optimize operating conditions.

In general contour mapping systems in use today fall in the category of radar, optical or acoustical. The use of radar systems is primarily for long range, such as airborne mapping of earth surfaces and does not provide the capability of short range resolution required in monitoring materials handling systems. Laser based optical systems have become effective with the introduction of high power, tunable lasers. However, such optical systems would not be useable in a dusty atmosphere which is normally associated with materials handling systems, especially coal handling systems.

Therefore, it is desirable to provide an acoustic based system for high resolution, short range, surface contour mapping. Conventional acoustic-based systems do not provide sufficient focusing of the acoustic beam to measure small differences in range over an area or object being surveyed. These systems do not have the capability of generating surface contour maps in real time while providing automatic focusing and density compensation. Real-time generation of accurate surface contour maps is necessary in order to gain knowledge of the dynamic behavior of bulk materials handling, especially in fluidized beds or gasifiers.

Accordingly, there is a need for an acoustic-based contour mapping system for real-time generation of surface contour maps of materials in confined containments from a fixed position at the top of the containment which is capable of autofocusing and density compensation.

SUMMARY OF THE INVENTION

In view of the above need, it is an object of this invention to provide an acoustic-based contour mapping system for generating surface contour maps in real time.

Another object of this invention is to provide an acoustic-based contour mapping system as in the above object which further provides automatic focusing and selectable density compensation.

Yet another object of this invention is to provide an acoustic-based contour mapping system for real time mapping of the surface contour of contained materials from a single location above the surface by means of digital phased-array scanning.

Further, it is an object of this invention to provide an acoustic-based contour mapping system as in the above objects which has a measurement resolution of $\pm 2$ inches over a range of from about 5 to 20 feet distance between the transmit/receive transducers forming the phased-array detection unit and the surface being mapped.

Other objects and many of the attendant advantages of the present invention will be apparent to those skilled in the art from the following detailed description of the invention taken together with the drawings.

In summary, this invention provides real time ultrasonic surface contour mapping by means of a system including a digitally-controlled phasedarray of transmitter/receiver (T/R) elements located in a fixed position above the surface to be mapped. The surface is divided into a predetermined number of pixels, depending on the desired resolution for the system. Each pixel is separately scanned by an arrangement of T/R elements which are excited by applying phase-delayed signals thereto that produce ultrasonic tone bursts from each T/R that arrive at a point X in phase and at the same time relative to the leading edge of the tone burst pulse so that the acoustic energies from each T/R combine in a reinforcing manner at point X. The signals produced by the reception of the echo signals reflected from point X back to the T/Rs are also delayed appropriately so that they add in phase at the input of a signal combiner. This combined signal is then processed to determine the onset of the received tone burst echo to determine the two-way sound wave travel time and from that, the range to the point X using density-corrected sound velocity values. An autofocusing signal is developed from the computed range for a complete scan of the surface pixels. The ranges to the scanned points on the surface are stored for alternate scans in a pair of range memories. The stored values are alternately read from these memories and a display signal is generated for presenting a real-time three-dimensional surface contour map on a video monitor.

Calibration standardization may be accomplished by periodically deploying a standardization target, focusing on the target and then correcting the range and focus calibration accordingly.

BRIEF DESCRIPTION OF THE DRAWINGS

FIG. 3, which is made-up of FIG. 3a and 3b, is a detailed drawing of the insulating cup-shaped material which holds each T/R, as shown in FIG. 2.

FIG. 12 is a block diagram of the filtering scheme used in the range detect and focus computer shown in FIG. 9.

DETAILED DESCRIPTION

Figure 1:
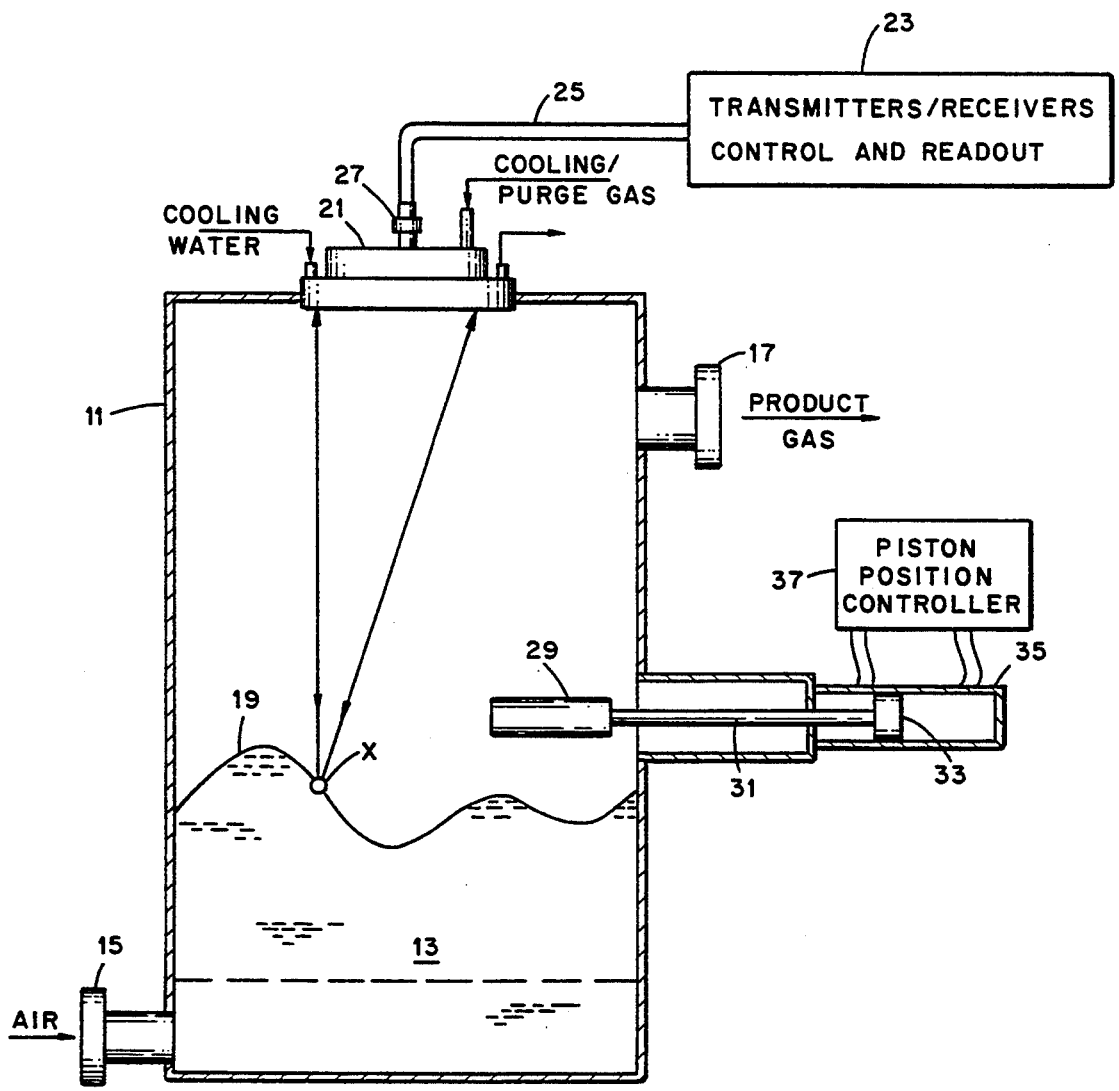
FIG. 1 is a schematic diagram of a fluidized-bed vessel adapted with an ultrasonic mapping system according to the present invention for mapping the surface contour of the bed surface.

Referring now to FIG. 1, there is shown a fluidized-bed vessel 11 for the containment of a coal bed 13 maintained in a fluid state by means of the introduction of air through inlet port 15 and the exhaust of product gas through outlet port 17 produced by the controlled combustion of the coal in the bed 13. In order to monitor the bed surface 19 contour in accordance with the present invention, a phased array of transmitter/receiver (T/R) elements contained in a formed probe assembly 21 is located in an opening in the top of vessel 11 and is provided with water cooled passages and a cooling-/purge gas channel for the introduction of an inert gas, such as nitrogen, to provide convective cooling of the T/R elements as will be explained in detail hereinbelow. Each T/R element of the probe array is connected remotely to the system control and readout electronics 23 through a multilead cable 25 connected through a pressure seal 27. The monitored surface is divided into a plurality of pixels, with each pixel having a focal point X, and each pixel is continually scanned in order to monitor the surface contour and provide a real time contour map, as will be explained herein below.

In order to provide continued calibration, a standardization target 29 may be provided which is deployed to a known position within the vessel. The target 29 may take the form of a metal pixel-shaped disc attached to a rod 31 which is coupled to a positioning piston 33 of a pneumatic controlled positioning device 35 operated by a controller 37. The target is positioned in a selected one of the preselected areas and a reading is taken from the target for correcting the range and focus calibration accordingly, as will be explained.

Figure 2A:
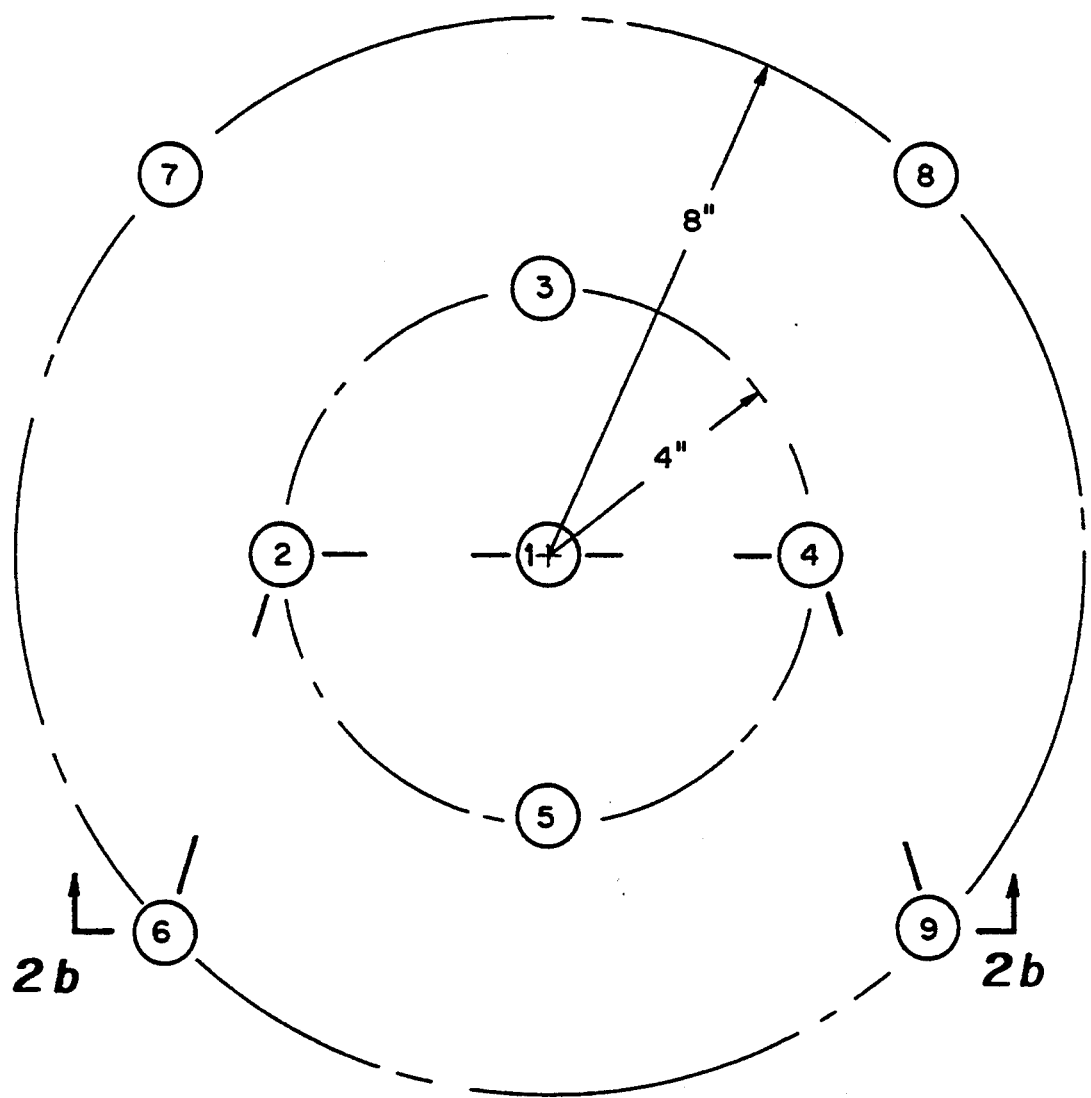
FIG. 2, which is made-up of FIGS. 2a and 2b, depicts the arrangement of the T/R elements in the probe assembly 21 of FIG. 1, wherein like reference characters refer to like parts.
Figure 2B:
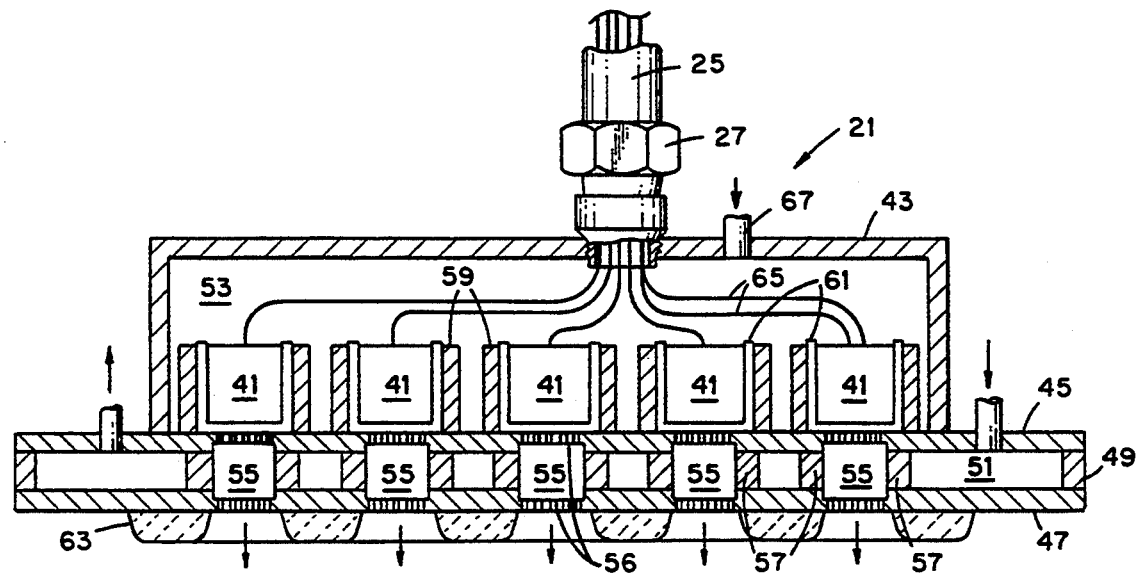
Figure 4:
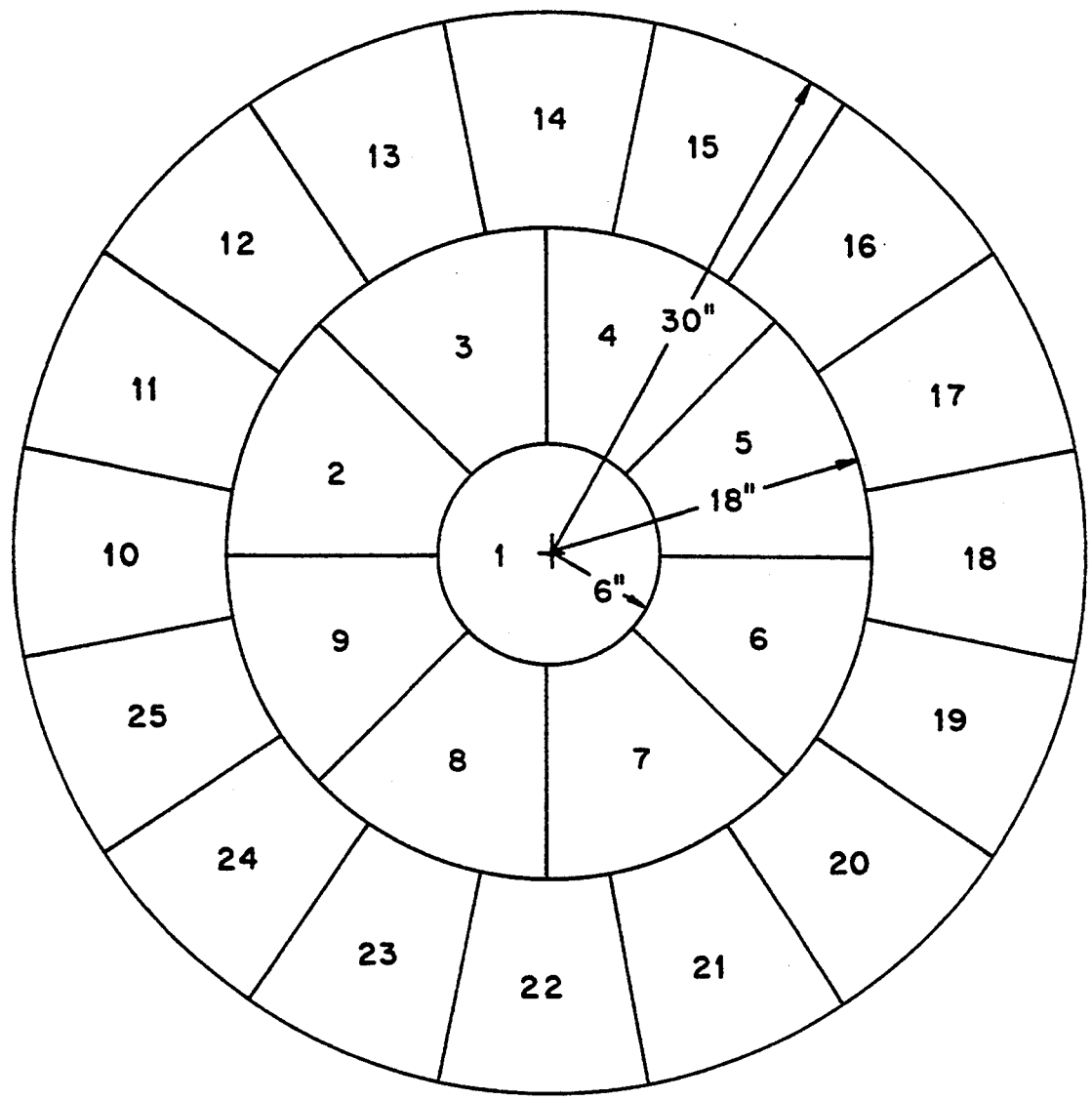
FIG. 4 is a schematic illustration depicting the layout of the selected surface map contour segments, or pixels, for a 25 pixel division.

Referring now to FIG. 2 there is shown an arrangement of T/Rs used in the probe of this example in FIG. 2a and a cross-section of the probe assembly 21 in FIG. 2b. It will be understood that the number of T/R elements forming the phased array within the probe assembly may vary depending on the contour mapping resolution desired. The probe shown in FIG. 2 contains nine T/R elements. The surface 19 to be monitored is divided into 25 pixels as shown in FIG. 4 for the cylindrical vessel 11. A focal point X is selected in each pixel which is the scanned location that determines the elevation of each pixel of the contour map.

As shown in FIG. 2b, the probe assembly includes a housing 43 having a base portion formed of a pair of spaced apart plates 45 and 47 sealed about the outer periphery by a wall portion 49 to provide a chamber 51 for the circulation of cooling water. The upper portion of the housing forms a chamber 53 into which nitrogen gas is introduced for purging sound conduction passages 55 formed between the lower plates 45 and 49 and direct convection cooling the T/Rs 41. Each passage 55 is formed by sealably disposing a sleeve 57 with the inner opening aligned with the location of each T/R 41 so that perforations 56 provided in the plates 45 and 49 for each corresponding T/R location allows communication of sound between the T/R and the vessel interior.

Each T/R is disposed in a sleeve 59 attached at one end to the plate 45 coaxially in alignment with the corresponding sound passage 55. The T/R elements may take the form of ceramic piezoelectric crystals or electromagnetic or capacitance transducers, having a resonant frequency in the range of about 20 to 50 KHz. The illustrated elements are ceramic crystal elements, such as the Model EFR-ODB25K2 supplied by Panasonic Corp., Teterboro, N.J. These devices are in the form of cylindrical elements approximately ⅜" in diameter by ⅜" in height and have a resonant frequency of 39 KHz.

Figure 3A:
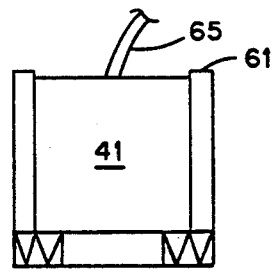
FIG. 3a is a partially cut-away elevational view and FIG. 3b is a top view.
Figure 3B:
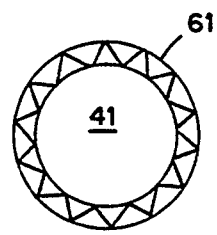

In order to isolate each T/R element from vibration and harsh thermal conditions, the element is first mounted in an insulating cup 61 formed of a silicone rubber waffle cushion material, as shown in detail in FIG. 3a and b, prior to being inserted into the sleeve 59. The waffled material allows the flow of nitrogen introduced into the chamber 53 around the T/Rs 41. In addition a thermal insulation disk 63, formed of castable ceramic foam, may be layered onto the bottom of plate 47 to provide additional thermal protection from the high-temperature bed 13 shown in FIG. 1.

Each T/R is connected to the system electronics by means of a shielded cable 65 entering the chamber 53 through the sealing connector 27 and forming one of the leads of the multiple lead cable 25, as shown in FIG. 1. The chamber 53 is pressurized with nitrogen gas introduced through an inlet 67 to a sufficient pressure to prevent the flow of process gas into the chamber 53. The gas passes through the insulating cups 61 to provide cooling of the T/Rs and out through the passages 56 in plates 45 and 47 into the vessel 11 interior where it is removed with the product gases.

Figure 5:
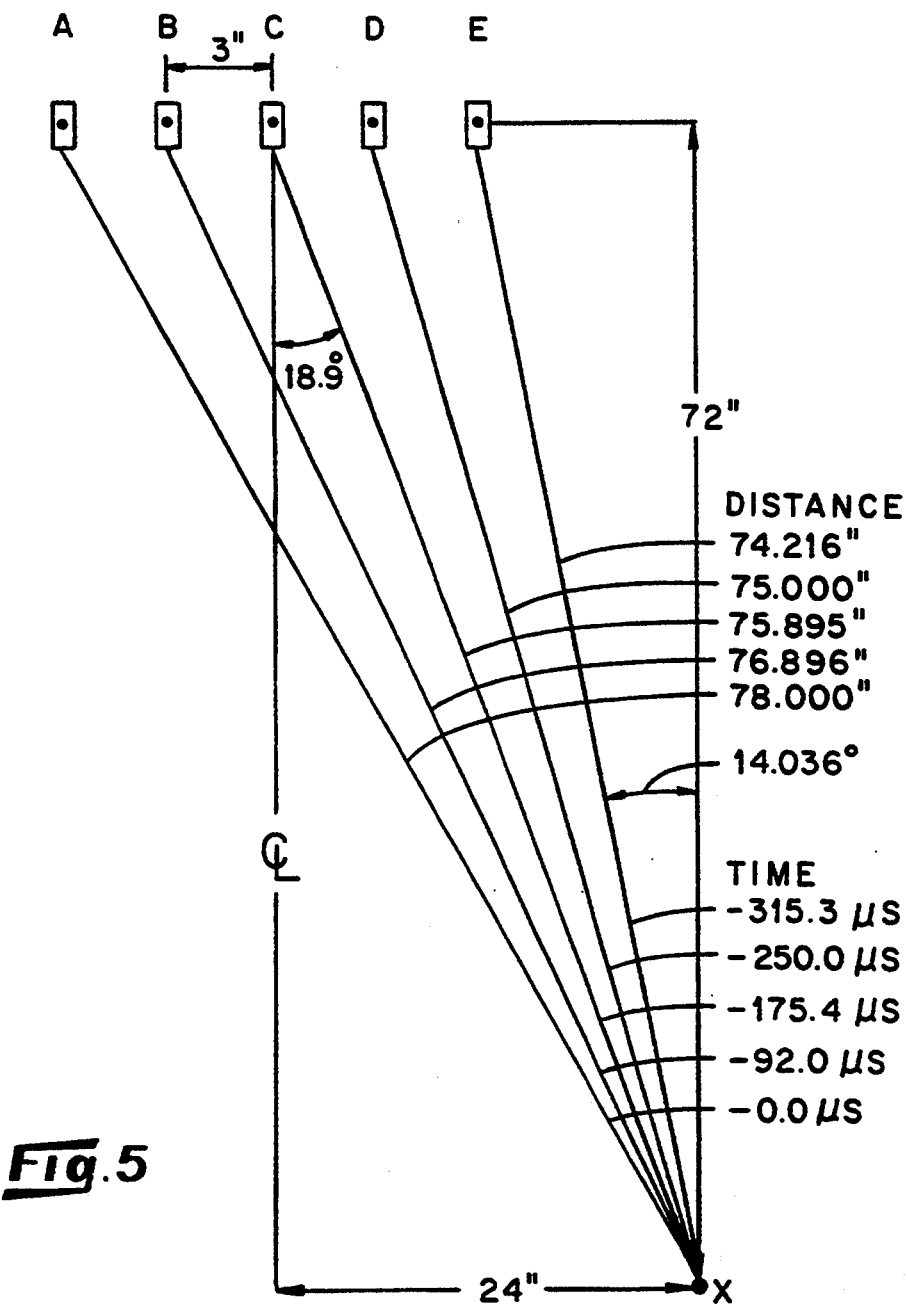
FIG. 5 is a graphic illustration of T/R array excitation to provide focusing of the acoustic signals at a position X of the surface being mapped.

Referring now to FIG. 5, the illustration shows how the spacing between the T/Rs in a cluster of five T/Rs (A, B, C, D, and E) affects the timing of the tone burst and reception of the echo signals from a focal point X on the surface. The T/Rs are shown spaced apart on 3-inch centers and driven to be focused on a point X which is 72 inches from the reference plane of the probe and 24 inches from the center of the probe. The focusing is accomplished by exciting the T/Rs A through E with phase delayed signals which produce tone bursts from all five elements that arrive at point X in phase and at the same time relative to the leading edge of each tone burst. When excited in this manner, the bursts from all five T/Rs combine in a reinforcing manner at point X, but, in general, not at all other locations in the ultrasonic array wave field region. For the example illustrated in FIG. 5, the required phase delays of T/Rs A, B, C, D, and E are 0.0 μsec, 92.0 μsec, 175.4 μsec, 250.0 μsec, and 315.3 μsec, respectively, to focus on point X, located as indicated. The received echo signals reflected from point X to T/R s A through E must also be delayed appropriately so that they add in phase at a receiver signal combiner. Although the focusing principle has been illustrated here using only 5 T/Rs, it will be understood that various probe arrays with different numbers of T/Rs may be used according to the application.

Figure 6:
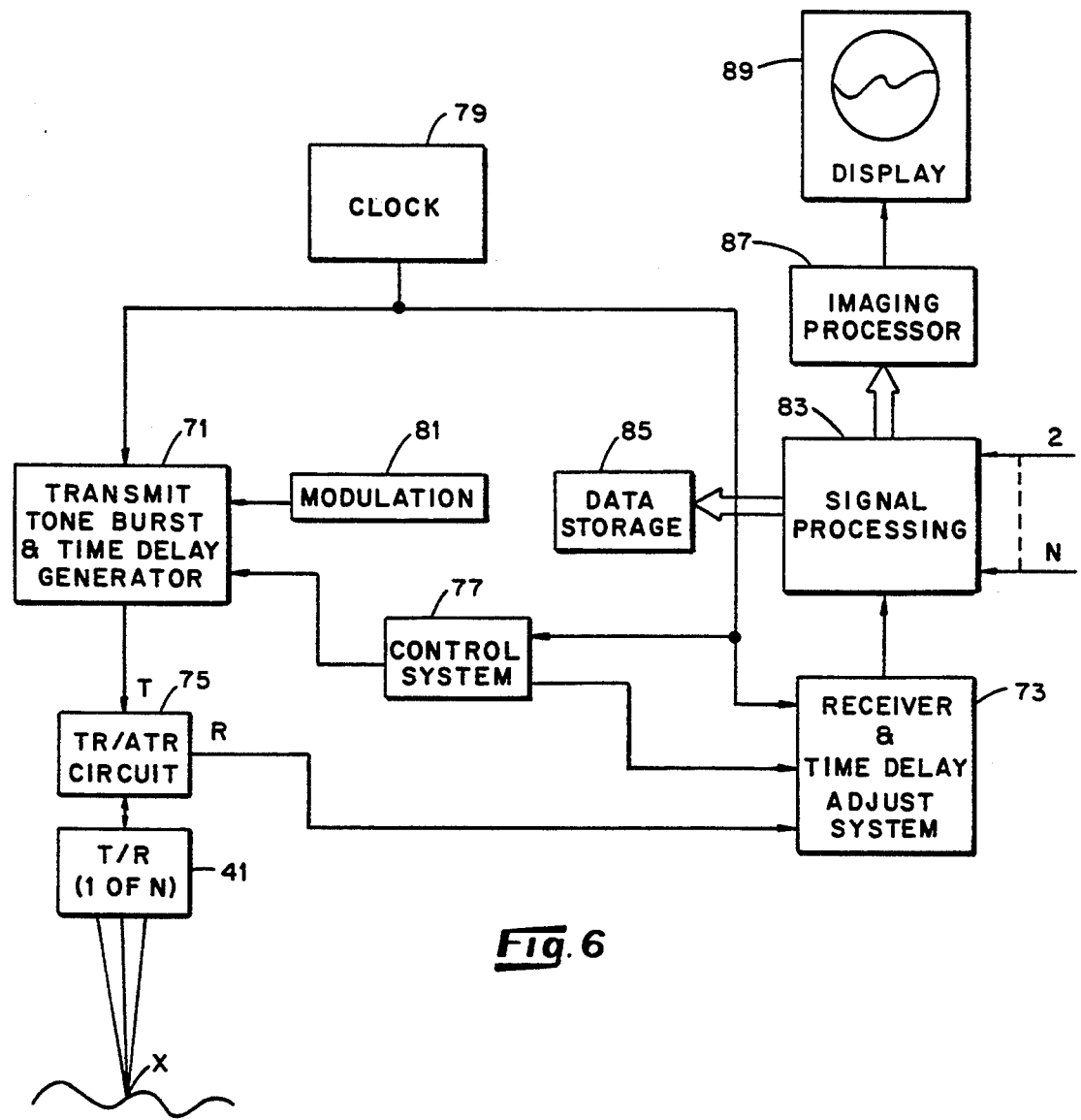
FIG. 6 is a schematic block diagram of the ultrasonic contour mapping system according to the present invention, as illustrated in FIG. 1.

Referring now to FIG. 6, there is shown a block diagram of a system according to the present invention which specifically illustrates one of a plurality of N transmit and receive channels associated with one of the T/Rs 41. Tone burst signals having the appropriate delays are generated in a transmitter 71 and applied to the corresponding channel T/R 41 through a switching circuit 75. The switching circuit 75 may take the form of a passive switching network which blocks the returning signal response generated by the T/R from the output of the transmitter 71 while passing these signals to a receiver circuit 73 which detects the returning signals and provides the appropriate delays corresponding to their point of detection. The switch also blocks the transmitted signal from the receiver input. Details of these circuits and how the transmitted signals and the received signals are delayed for appropriate recombination will be explained hereinbelow.

As shown in FIG. 6, the tone bursts are generated under timing control from clock pulses produced by a fixed frequency clock 79, typically operating at 10 MHz, which is applied to one input of a tone burst and time delay generator 71 of the transmitter section of the system. The clock pulses are also applied to the receiver 73 and a control circuit 77 which provides timing control for the transmitted and received pulse trains through synchronization with the clock pulses from clock 79.

The transmitted tone burst are modulated by means of a modulator 81 connected to the transmitter 71 to produce a frequency spectrum that can be processed to extract accurate transducer-to-pixel range values in the presence of extremely noisy echo signals. The signals are both amplitude and frequency modulated in a unique way by means of a modulation circuit 81 connected to the transmitter 71 to enhance signal echo recognition, as will be explained below.

The corresponding channel signal is detected and time delay adjusted by the receiver circuit 73 under control of the control system 77 prior to being passed to a signal processor 83 which also receives the properly time delayed signals from the remaining 2 through N channels, as shown. The appropriately time delayed signals from all channels are combined to produce the signal from which the bed level of the particular pixel being measured is extracted. After processing and A/D conversion, the combined range signal may be stored in a digital data storage device 85 for later analysis. Further, the range signal is passed on immediately to a digital imaging system processor 87 where the equivalent range signals for each of the 25 pixels are used to generate bed-level information for real time display on a display device 89 in a conventional manner. The control system 77 may take the form of a microprocessor programmed to provide the various control functions and computed values to operate the system as will now be described in more complete detail.

Figure 7:
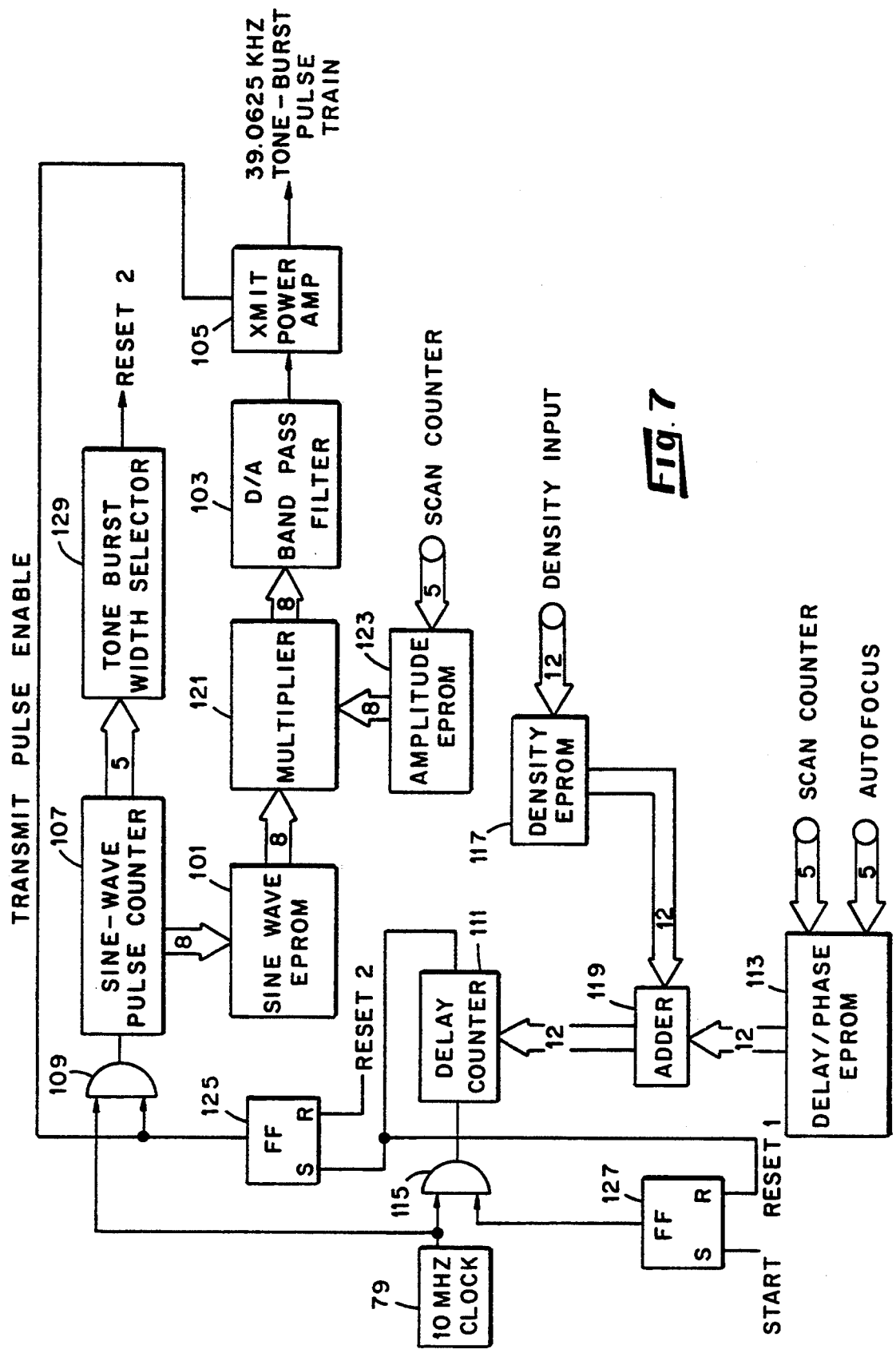
FIG. 7 is a detailed schematic block diagram of the transmitter section 71 of the FIG. 6.

Beginning now with the transmitter section, details of the various circuits of the system will be described. As pointed out above, each of the N pixel channels includes a transmitter 71 which generates a tone burst for the corresponding channel T/R 41. As shown in FIG. 7, each of the transmitters generates a digitally synthesized sine-wave tone burst signal by reading digital values previously stored in an EPROM memory 101 sequentially into a D/A converter 103 so that when the values are converted, they form a synthesized M cycle pulse burst which is applied through a transmit power amplifier 105 to the corresponding T/R 41 of the array. Reading of the EPROM 101 values is accomplished by applying the 10 MHz clock pulses from the system clock 79 (see FIG. 6) to the input of a pulse counter 107 through a gate 109 when the gate is enabled following the appropriate delay for the particular T/R being excited.

Figure 8:
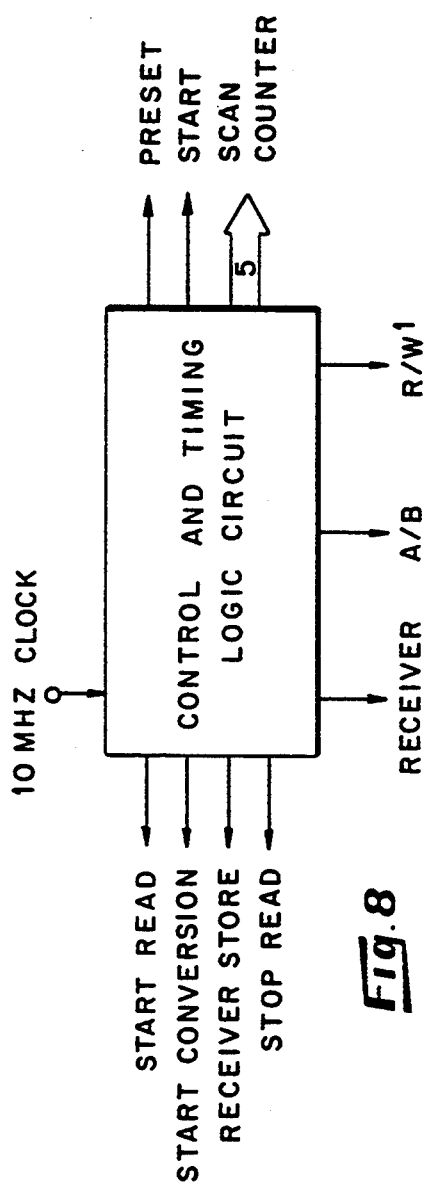
FIG. 8 is a block diagram of the controller illustrating the various control outputs labeled according to their function and connection in FIGS. 7 and 9.

To provide the necessary phase delay for the transmitted tone burst of each T/R of the array, each channel includes a delay counter 111 which is preset at the start of each pixel sampling sequence by presetting the delay counter with the digital 1's complement value of the required delay supplied by a delay/phase EPROM memory 113. The counter is counted up by applying the 10 MHz clock pulses to a count input thereof through a gate 115. When the counter counts up through zero, it provides a "Reset 1" output signal indicative thereof. The delay/phase EPROM 113 is programmed with 32 blocks of 32 different phase values. Each block provides a set of phase values corresponding to one of 32 different average surface autofocusing levels at equal intervals between the upper and lower range of the bed level. The phase values within each block provide up to 32 scan points at each of the intervals between the upper and lower levels. The delay/phase EPROM values are addressed in sequence by a 5 bit scan counter input from the scan counter output of the control system 77 as shown in FIG. 8. Further, density compensation is added to the phase delay by means of a density EPROM memory 117 and adder 119. The density EPROM 117 is programmed to correct the phase delay for changes in sound velocity with internal gas density according to the relationship:

$$\text{Phase Delay} \propto \frac{1}{v} \propto \sqrt{d},$$

where d is the gas density and v is the sound velocity in gas. Transmit toneburst amplitude control for array beam shaping is accomplished by means of a digital multiplier 121 connected between the sine-wave EPROM 101 and the D/A converter 103. The multiplier value is supplied to the multiplier 121 by means of amplitude EPROM 123. The EPROM 123 is programmed with 32 amplitude multipliers, one for each scan position, which are addressed sequentially by the scan counter output from the control system 77.

The remainder of the transmitter section consists of a pair of flip-flops 125 and 127 which control the passage of the clock pulses through the gates 109 and 115, respectively. Flip-flop 127 has its set input (S) connected to receive the "Start" signal from the controller 77 and its reset input (R) connected to receive the "Reset 1" signal from the output of the delay counter 111. The set input of flip-flop 125 is connected to the output of counter 111 and the reset input is connected to receive a "Reset 2" signal which is indicative of the selected number of sine wave cycles for the generated tone-burst pulse train. This selection is made to optimize signal-to-noise ratio and range accuracy. The total registered count indicates the approximate number of sine wave cycles per burst. Both amplitude and frequency modulation are incorporated into the value stored in the sine wave EPROM 101. For a 9-cycle sine waive burst there are 2304 clock cycles. As shown, the output of flip-flop 125 is also connected to the enabling input of the transmitter power amplifier 105 to reduce noise at the output between bursts.

Figure 10:
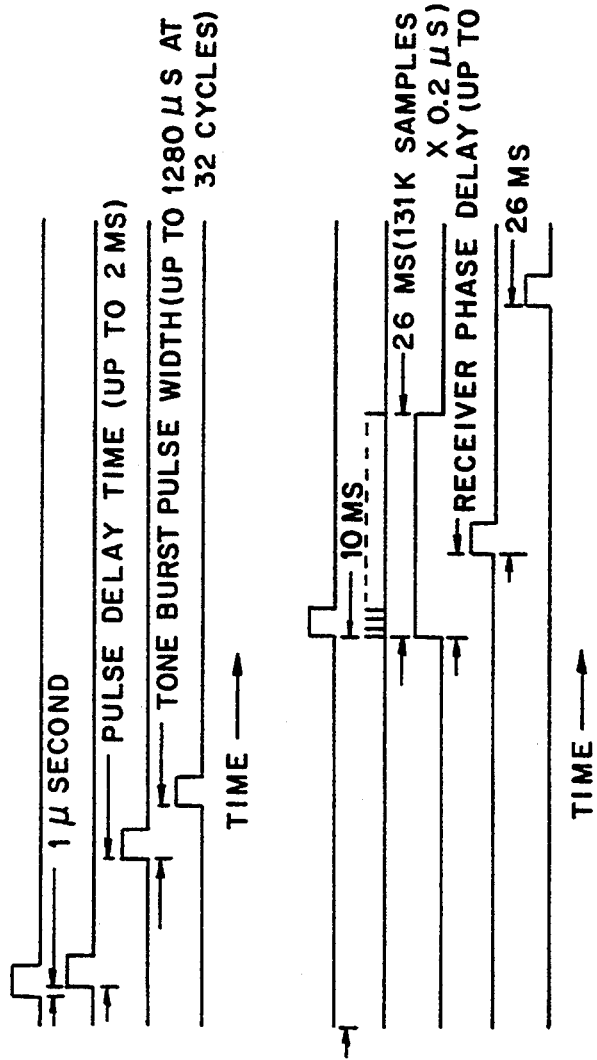
FIG. 10 and 11 are timing diagrams illustrating the timing of the various control signals generated by the controller 77 of FIG. 6 for control of the operation of the transmitter and receiver sections, respectively.

As shown in the timing diagram of FIG. 10, the operation of the transmitter section is triggered by first applying the "Start" signal simultaneously to all transmitters following the application of a "Preset" signal to the receiver section which will be explained hereinbelow. This sets flip-flop 127 of each channel, which provides an enabling signal to gate 115, allowing it to pass the clock pulses to the delay counter 111. The delay counter is preset to the proper delay value for the channel. When the counter counts up through zero, the "Reset 1" signal is produced by the counter 111 which resets flip-flop 127 and sets flip-flop 125, enabling gate 109 to pass the clock pulses to the sine-wave pulse counter 107. This initiates the start of the tone burst to be transmitted by this particular channel through the application of the counter values as addresses to the sine-wave EPROM 101 to sequentially apply the stored values for the generation of the sine wave to the D/A converter 103 through the multiplier 121. Typically there are about 256 values stored in the EPROM for generating each sine wave cycle of the tone burst. The exact value depends on the modulation factors. The full 9 cycle sine wave tone burst with modulation included is stored in the sine wave EPROM 101.

As pointed out above, the tone burst enabling signal is also applied to the transmitter power amplifier 105. The tone burst signal is applied to the channel T/R element 41 which produces the actual tone burst directed onto the bed at the proper phase. The tone burst is terminated when flip-flop 125 is reset by the "Reset 2" signal from the tone burst width selector 129. The tone burst developed by the D/A converter 103 is bandpass filtered and then applied to the power amplifier 105. The power amplifier is designed to boost the tone burst level to about 100 volts peak-to-peak at the T/R 41 input.

The echo signals received at each T/R of the array is routed to the corresponding channel receiver and time delay adjustment system 73, as shown in FIG. 6. Each receiver section of each channel is identical in structure as will now be described with reference to FIG. 9.

Figure 9:
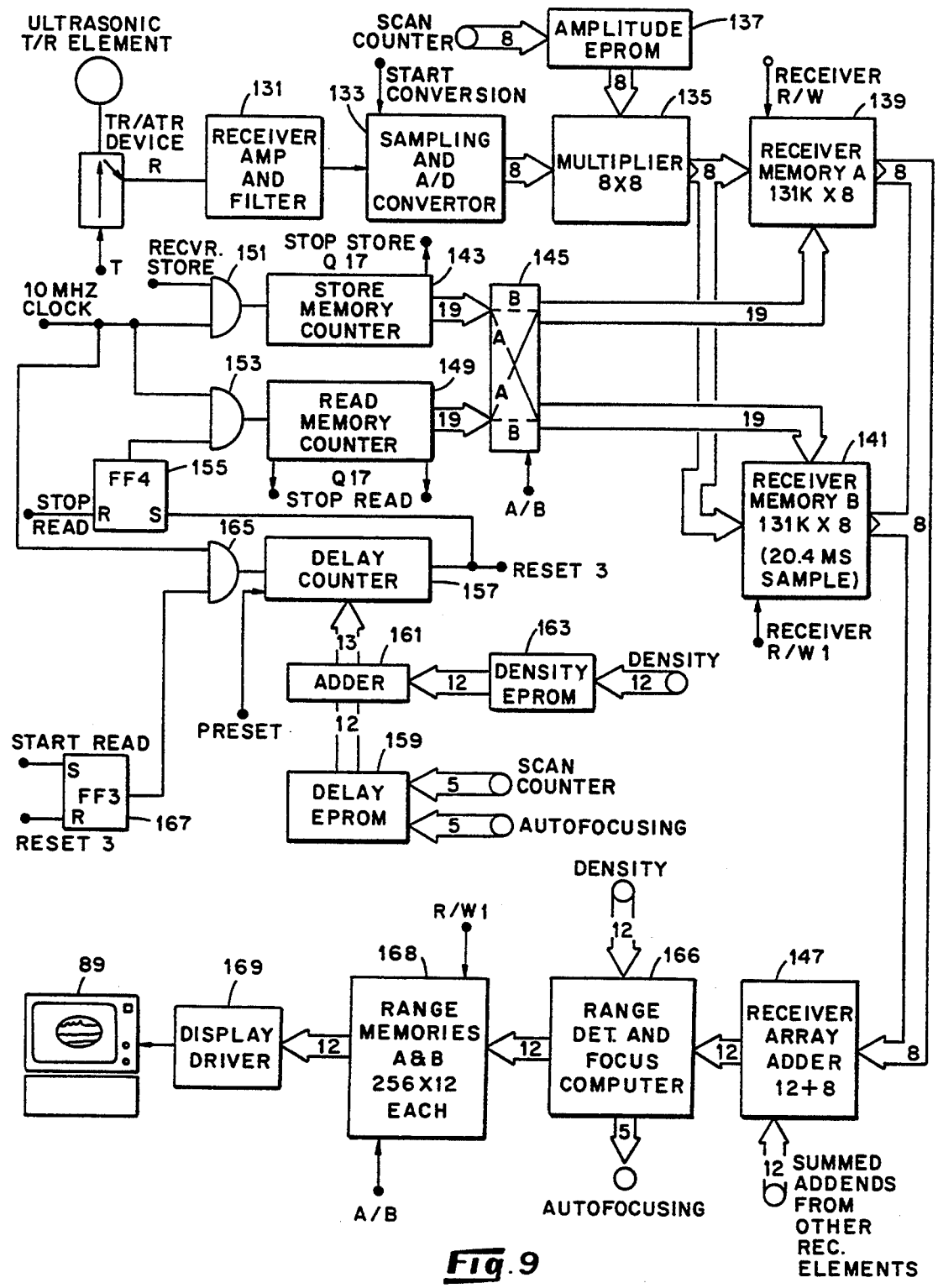
FIG. 9 is a detailed schematic block diagram of the receiver section 73 of FIG. 6.

Referring now to FIG. 9, it will be seen that the transduced signals from the echoes received at the transducer 41 for the particular channel is applied to the input of a receiver amplifier and filter 131. The output of the amplifier 131 is connected to the input of an analog-to-digital converter 133 where the signal is converted to 8-bit digital signal components at up to the 10 MHz clock pulse rate which are fed to an 8 by 8 bit multiplier 135 whose multiplicand is supplied from an amplitude EPROM 137. The values stored in the EPROM 137, which represent the desired beam shape as the beam is scanned over the bed surface, are addressed sequentially by the scan counter input, as described above with reference to the multiplier 121 in FIG. 7, to provide the amplitude modification for beam shape.

The 8-bit output of the multiplier 135 is connected to 8-bit inputs of two receiver memories 139 and 141 which are alternately activated to store the received signal values to allow continuous receiving and processing of the echo signals. Memory 139 is activated to store values read from multiplier 135 during a sampling period, typically 26 milliseconds, while the values previously stored in memory 141 are being read and processed for range determination. The reverse takes place during alternate periods corresponding to alternate tone burst echo signals.

Addressing for the receiver memories 139 and 141 in the signal storing mode is provided by a store memory counter 143 through a digital switch 145 which alternately switches the counter output to the addressing inputs of memories 139 and 141 in response to the A/B control signal from the controller 77, see FIG. 6. Alternatively, the values stored in memories 139 and 141 are addressed for readout to a receiver array adder 147 by means of a read memory counter 149 whose output is alternately applied to the address input of the counters 139 and 141 through switch 145, so that when one receiver memory is in the read mode the other receiver memory is switched to the write mode, as determined by the R/W and R/W$^1$ signals applied to the memories 139 and 141, respectively, from the controller 77. The counters 143 and 149 are advanced at the clock frequency by applying the 10 MHz system clock pulses to the count inputs thereof through gates 151 and 153, respectively. The enabling input of gate 151 is connected to receive a "Receiver Store" signal from controller 77 to control the timing of the application of the clock pulses to counter 143. The enabling input of gate 153 is connected to the output of a flip-flop 155 which has its reset input (R) connected to receive a "Stop Read" signal from the controller 77 and its set input (S) connected to the output of a delay counter 157 which is activated when the counter counts up through zero to generate a "Reset 3" signal which sets flip-flop 155, enabling gate 153.

The delay counter 157 and associated circuitry, including a delay EPROM 159, adder 161 and density EPROM 163, is identical in structure and operation to the delay counter circuitry shown in FIG. 7 and described above. The same delay values for each transducer are loaded into the delay EPROM and this density adjusted value is read into the delay counter 157 from the adder 161 when a "Preset" signal is applied to a read control input of counter 157 from the controller 77. The count input of counter 157 is connected to the output of a gate 165 which has one input connected to gate the system clock pulses to the counter 157 when enabled. The enabling input of gate 165 is connected to the output of flip-flop 167 which has its set input (S) connected to receive a "Start Read" signal from controller 77 and the reset input connected to receive the "Reset 3" signal from delay counter 157 so that the flip-flop 167 is reset when the delay counter counts up through zero, disabling gate 165 to pass the clock pulses to the counter 157.

The "Reset 3" signal also sets flip-flop 155 which enables gate 153 to gate the system clock pulses to the read memory counter 149 which counts the clock pulses to generate addresses for the digitized signal values being read from either memory 139 or 141, depending on the state thereof. Delaying the reading of the memory values, provides the appropriate phase delay for that T/R's echo to receive focusing based on the distance from the surface target scan "spot" to that particular channel's T/R.

The delayed digital echo signals from all receiver channels are summed by the receiver array adder 147 so that they combine in phase as received after being reflected from the selected scan "spot" on the bed surface. The combined digital signals are fed to a microcomputer 166 which is programmed to analyze the composite digital signals to determine the onset of the received tone burst echo from which the two-way sound wave travel time is calculated and, from this information, the range to the "spot" is calculated using the density corrected sound velocity. Ranges to each of the scanned "spots" of the monitored surface are stored in range memories 168 which form a part of the imaging processor 87 (see FIG. 6). Ranges to the scanned "spots" on the surface are stored for alternate scans in separate range memories A and B. The stored values are alternately read from these memories into a standard display driver 169 of the imaging processor and a display signal is generated for presenting a real-time three-dimensional surface contour map on a video monitor.

Figure 11:
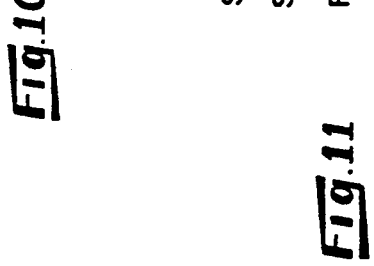

Referring now to the timing diagram shown in FIG. 11, it will be seen that the operation of the receiver sections of each channel is triggered each read cycle by the application of the "Start Read" from the controller 77 to the set input of flip-flop 167 to begin the receiving process for each scanned "spot". The application of this signal is delayed for a short period of time from the beginning of the transmitter tone burst, in this case 10 milliseconds to allow for the time required for the echoes to begin to return to the T/R's 41. This action enables gate 165 to gate the clock pulses to the delay counter 157 which has been preset to the appropriate delay value stored in the delay EPROM 159 for the particular scan "spot" and modified by the gas density compensation that is added by the adder 161 from the density EPROM 163. The delay EPROM 159 has 32 blocks of 32 scan delay values that are selected by a 5-bit autofocusing input to correspond to average "spot" range from 5 to 20 feet for each 0.5 foot increment. The autofocusing signal is generated based on the timing of the reflected range signals and is updated each read cycle.

Once the delay counter 157 is counted up to zero, the "Reset 3" signal is generated which sets flip-flop 155, thereby enabling gate 153 to pass the clock pulses to the read memory counter 149. Depending on the state of switch 145, either the receiver memory 139 (A memory) or the receiver memory 141 (B memory) is addressed for readout by the read memory counter 149. The selected memory values are read into the receiver array adder 147 along with those form the other channels where they are combined and processed by the range detect and focusing computer 166 and fed to the display processor.

Simultaneous with the process of reading values stored in one receiver memory, the other memory is switched by the R/W signal to store detected echo values which are addressed by the store memory counter 143 counting the clock pulses following activation by the "Recvr. Store" signal from controller 77 to the enabling input of gate 151. The timing of this signal is set to activate the store memory counter 143 coincident with the application of the "Start Read" signal to flip-flop 167. These memories are continuously switched between the store and read modes by the R/W signals being supplied to control inputs thereof so that echo signals are continuously received and processed. The computer 166 generates an updated "Autofocusing" value from the computed average range for a complete scan of the surface, i.e. all "spots" for each subdivision of the surface. This signal is applied to the Delay EPROMS of both the transmitter and receiver sections of each channel to enhance the signal detection and processing accuracy in presenting the real-time three dimensional surface contour map on a video monitor.

Calibration/standardization is accomplished by periodically deploying the fixed position target as shown in FIG. 1, allowing the system to focus on the target and then correcting the range and focus calibration accordingly by recalibrating the range estimates as computed by the range and focus computer 166.

In order to test the invention, the contour mapping system as described above was tested using computer simulation together with a nine element T/R probe arrangement. The computer simulation provided means for adding noise to the signals in the receiver subsystem to account for noise and other variations that would naturally occur in practical electronic circuits and to account for reflected signals from the vessel walls and from out-of-focus points on the bed surface due to surface variations. A frequency-modulated basic tone-burst carrier signal is generated in which the frequency is varied linearly from 39.02625 kHz at the beginning of a nine-cycle tone burst to a value $(1+0.05)$ times its initial frequency. This signal is also amplitude modulated with a modulation index larger than 100 percent by varying the frequency linearly from 1.30 kHz at the beginning of the tone burst to a value 1.50 times its initial frequency at the end of the tone burst. This modulation scheme produces a frequency spectrum that can be processed to extract accurate transducer-to-pixel range values in the presence of extremely noisy echo signals. The modulated carrier is processed to produce nine cycle bursts of the carrier signal with the starting time of each burst appropriately delayed such that the ultrasonic signal produced adds in phase at the focus range with each of the similarly-processed signals from the other eight transducers at the center of the pixel being scanned. FIG. 2a shows the arrangement of the nine transducers mounted in the probe assembly used in the simulation.

The transducers are horizontally mounted at the top center of a 5-foot diameter, vertically oriented vessel with a bed surface assumed to be limited to a range of 60 to 84 inches below the plane of the transducers. The bed surface is divided into 25 pixels as shown in FIG. 4 with transducer No. 2 in FIG. 2a located directly above the angular center of pixel 2. This specification of transducer-pixel orientation allows the calculation of the linear distance from the center of each transducer to the center of each bedsurface pixel. These distances together with the velocity of sound in the gas, corrected for conditions including temperature and pressure, determine the relative delay of each tone burst as it travels from the transducer to the "spot" and returns and, thus, the delay value applied to the transmitted and received signals of each transducer.

The appropriately delayed tone burst for each transducer is increased in voltage level to the transducer rating. The TR/ATR circuit 75 directs this high level signal to the transducer, keeping it out of the receiver system. The transducer transmits a nine-cycle burst of acoustic waves which, combining with the acoustic waves from the eight other transducers, are focused upon the pixel being examined. The reflected wave is returned to the transducer from which it was emitted as well as the other eight transducers. The electrical signal produced by the transducer in response to the detected acoustic energy is directed to the receiver 73 by the TR/ATR circuit 75. The signals from each channel are appropriately delayed and combined to produce the signal from which the bed level of the pixel being scanned is extracted. After processing and A/D conversion, the combined signal is stored for later analysis in the computer 166 (FIG. 9). The range signal is also passed on to the imaging system processor where the equivalent range signals for each of the 25 pixels are used to generate bed-level information for the real-time display.

Figure 13:
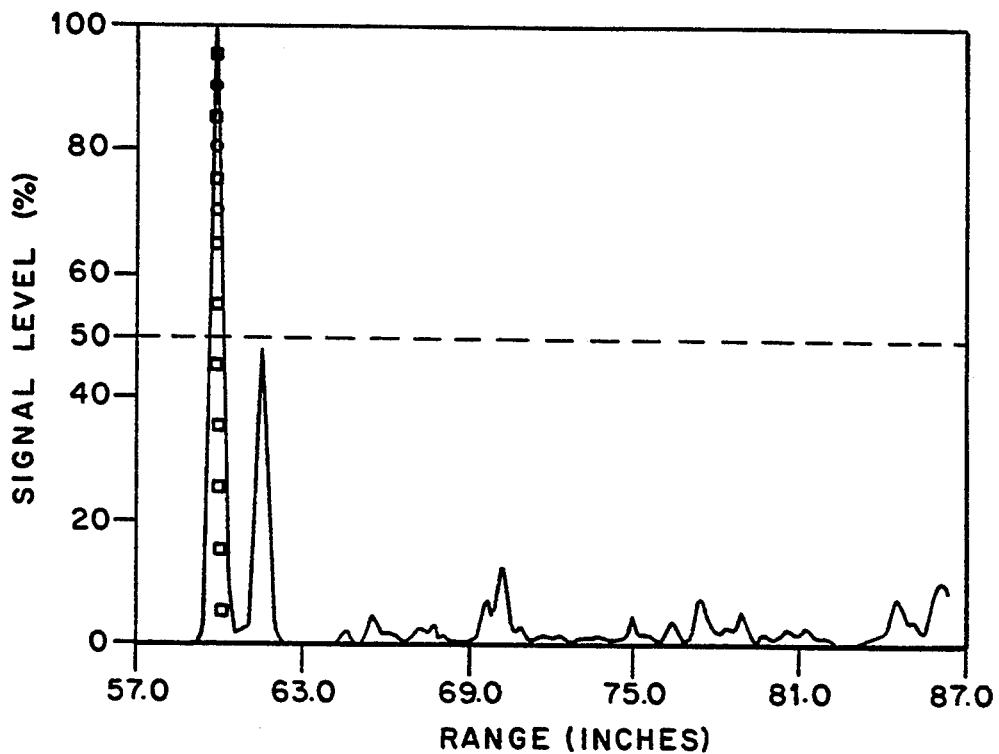
FIGS. 13 and 14 show the signal wave forms at various points in the filtering system shown in FIG. 12 for the beam directed at pixel 1 (FIG. 4), which has a true range of 60 inches, with a focus range of 60 inches.
Figure 15:
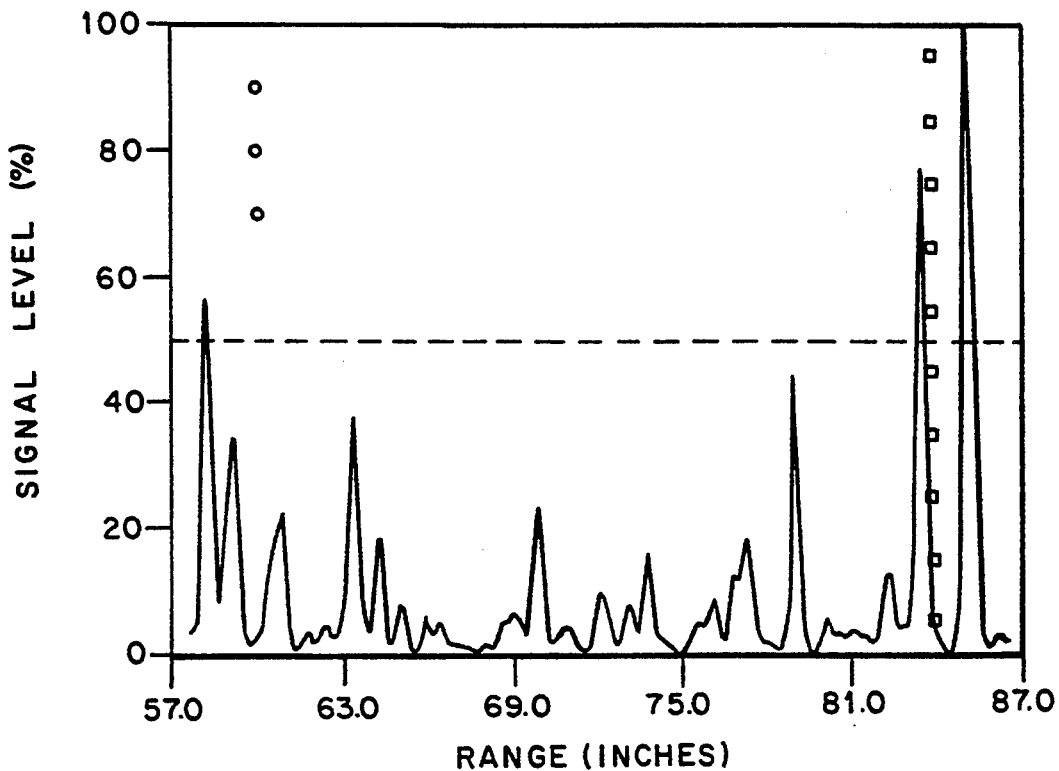
FIGS. 15 and 16 show the signal wave forms at various points in the filtering system shown in FIG. 12 for the beam directed at pixel 2 (FIG. 4), which has a true range of 83.92 inches, with a beam focus range of 60 inches.

Referring now to FIG. 12, there is shown a block diagram illustrating a portion of the signal processing procedure which may take the form of a hardware or software processor used to extract the range signal from the noisy, combined sum of echo signals. In either case the combined delayed digital signals from the adder 147 (FIG. 9) are fed to a matched finite impulse response (FIR) filter 171 matched to the tone burst modulation. The use of the matched filter causes the signal-to-noise ratio at the output of the filter to be maximized. The signal is then low pass filtered by means of a filter 173 having a Gaussian FIR to provide smoothing of the signal prior to demodulation by a demodulator which may take the form of a digital signal squarer 175 following the first low pass filter 173. The demodulated signal is then smoothed by means of a second low pass filter 177 also having a Gaussian FIR. The output of filter 177, which is illustrated in FIGS. 13 and 15 for a scanning of pixels 1 and 2, is passed to a range detector 179 using 50 percent threshold detection. The range detector uses the 50 percent threshold, indicated by the horizontal line in FIGS. 13 and 15, to obtain the estimate of the range to the scanned pixel for this step of the range determination process.

Figure 14:
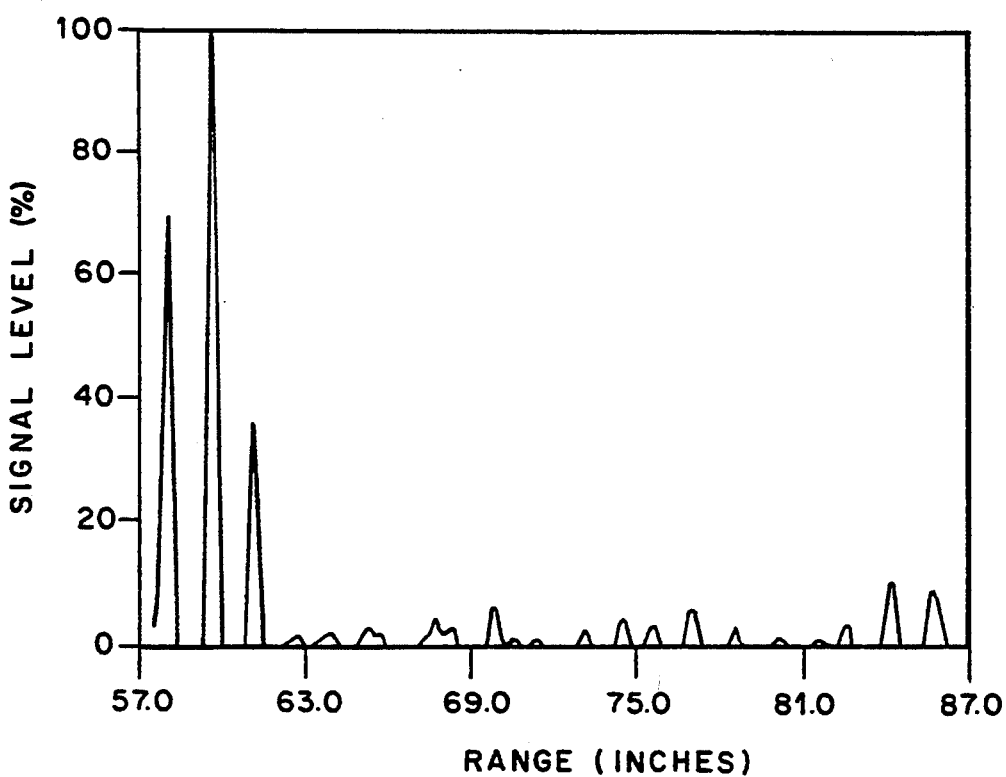
Figure 16:
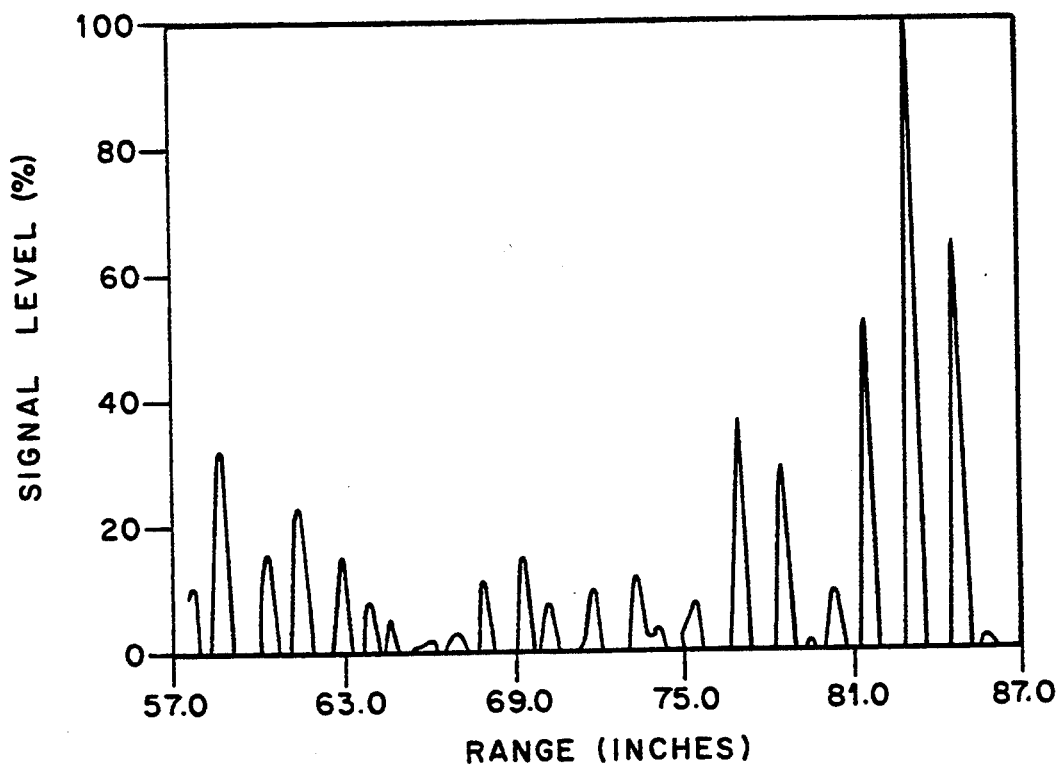

The output of the low pass filter 177 is also directed to a high-pass custom FIR filter 181 which is matched to the signal doublet. As shown in FIGS. 13 and 15, the ultrasonic signal modulation scheme causes a closely spaced pair of large peaks to appear near the true range value, indicated by the column of square points in each figure. The column of circle points indicates the initial beam focus range used. The custom filter 181 is designed to emphasize the dual peaks near the true range relative to the other signals present that would predict incorrect range values. The resulting outputs are shown in FIGS. 14 and 16 for the illustrated scanned pixels 1 and 2. This output is processed by a peak detector 183 where the value of the range to the pixel is determined as the range value at the largest signal peak. This value is used as the focus range to the scanned pixel on the next set of 25 pixel range measurements. For those cases where the surface elevation map changes by less than several inches between scans, the focus range is then optimum for accurate range determination.

As a means of further evaluating the system, a series of measurements of randomly assigned pixel elevation values were simulated with the system as designed. The simulated measurements were repeated with the same surface contour but with the matched filter 171 removed. This removes the signal-to-noise ratio maximization action of the filter and allows noise to contribute more to error in pixel range estimation. The simulated measurements were again repeated for the same surface contour, but both the input matched filter 171 and the low-pass filters 173 and 177 removed. These measurements lose the advantages of both signal smoothing and noise bandwidth reduction provided by the low-pass filters and the signal-to-noise maximization of the matched filter.

Additional tests were run to determine the accuracy within which measurements of the 25 pixels of the bed could be made for fixed focus ranges of 60, 72 and 84 inches. This procedure simulates operation on startup with an unknown bed contour. In each case, the system selected the largest amplitude range signal and used its range prediction as the pixel level for each of the 25 pixels. The focus range for each pixel is randomly selected for each consecutive scan until the custom filter output provides a focus range close to the measured range. Once this zeroing-in process for each pixel level is attained, the individual focus ranges are updated from scan to scan, thereby providing a dynamic readout for real time visualization of the bed level on the display device.

The same test were run with various filtering operations removed to further illustrate the effectiveness of the system design incorporating signal enhancement filtering. The following table is a summary of the results obtained from these tests. The simulation studies indicate that the implemented system would have an average determination error of around ±0.25 to ±0.31 inches for an expected bed level between 5 and 7 feet below the transducers. Assuming a linear relationship between range error and expected bed level range, an error of around ±2 inches, could be expected for an expected bed level range of 5 to 20 feet below the transducers.

TABLE

| Magnitude of Average Pixel Level Error | | | |
|---|---|---|---|
| | Center Pixel Error (inches) | Average Inner Ring Error (inches) | Average Outer Ring Error (inches) |
| Focus Range: 60 inches | | | |
| 1. All Filters Used | 0.272 | 0.512 | 4.51 |
| 2. Matched Filter Not Used | 0.272 | 1.072 | 4.18 |
| 3. Two Low-Pass and Matched Filters Not Used | 0.042 | 2.85 | 7.50 |
| Focus Range: 72 inches | | | |
| 1. All Filters Used | 0.215 | 0.342 | 1.24 |
| 2. Matched Filter Not Used | 0.215 | 0.708 | 2.76 |
| 3. Two Low-Pass and Matched Filters Not Used | 0.013 | 4.94 | 5.23 |
| Focus Range: 84 inches | | | |
| 1. All Filters Used | 0.186 | 1.19 | 1.74 |
| 2. Matched Filter Not Used | 0.186 | 0.836 | 2.98 |

TABLE-continued

| Magnitude of Average Pixel Level Error | | | |
| --- | --- | --- | --- |
| | Center Pixel Error (inches) | Average Inner Ring Error (inches) | Average Outer Ring Error (inches) |
| 3. Two Low-Pass and Matched Filters Not Used | 24.730 | 1.35 | 4.95 |
| Largest Focus Range Signal | | | |
| 1. All Filters Used | 0.272 | 0.309 | 0.284 |
| 2. Matched Filter Not Used | 0.272 | 0.845 | 2.27 |
| 3. Two Low-Pass and Matched Filter Not Used | 0.042 | 2.70 | 3.83 |

Thus it will be seen that an acoustic based contour mapping system for generating surface contour maps in real time has been provided which includes features to allow operation in high-temperature, dust-filled environments encountered in coal handling and utilization systems. The system permits extraction of surface elevation information from acoustic signals collected by the transducer array as echoes from the surface in these environments. The echo signals collected by one of the transducers contains noise produced by gas temperature, pressure and density fluctuations, sharp irregularities in the bed surface, reflections from the vessel walls, and the reception of echoes produced by transmissions from all of the other transducers of the array.

The system provides numerous advantages over known prior art systems by incorporation of autofocusing by computing the estimated range to the bed surface for each pixel and employing a feedback adjustment to vary the phase of the transmitted and received signals to enhance pixel elevation detection accuracy. A calibration target of known range and position may be provided to allow frequent calibration standardization. Pairs of alternating receiving memories and range memories are provided to avoid loss of alternate scan signals, thus, maximizing scan rate. The system provides enhancement of the rejection of out-of-focus and other interfering signals by incorporation of amplitude- and frequency-modulated tone-burst transducer excitation signals. Matched filters are used in the detection process to maximize signal-to-noise ratio in the received-signal processing system and the range value conversion process of the combined received signals.

Although the invention has been described by way of example of a specific system for use in monitoring the bed surface contour of a coal utilization device, it will be obvious to those skilled in the art that various modifications and changes may be made therein without departing from the spirit and scope of the invention as defined in the following claims, which are attached to and form la part of this specification. For example, the system may be modified for use in various measurement and monitoring applications in the utility and chemical industries, and to materials handling processes where surface contour maps are required. These contour maps could be used for flow monitoring and for bed level determination for material inventory in bins, hoppers, silos and stockpiles, and for gasifier- and fluidized-bed studies and operation. Pseudo-random sub-burst (chips) having phase, frequency and amplitude modulation is an alternate modulation approach. This system could also provide measurements to characterize the flow of solids in silos, hoppers, and lines in support of fossil energy research for the generation of a mechanistic solids flow modeling data base.

What is claimed is:

1. An ultrasonic surface contour mapping system comprising:

a material whose surface is to be mapped confined within a known boundary and whose surface is subdivided into preselected scanning areas identified as pixels;

a plurality of transmitter/receiver means for generating ultrasonic energy to be directed onto said surface in response to activation signals applied thereto and receiving echoes of said ultrasonic energy and generating receiver signals in response thereto, said plurality of transmitter/receiver means being disposed in an ordered array within a single plane above said surface to be monitored;

a transmitter means for generating and applying separate ones of said activation signals to each of said plurality of transmitter/receiver means during a transmit period, said activation signals being in the form of modulated signal bursts having an ordered phased relationship relative to the distance of the respective ones of said transmitter/receiver means from a selected pixel of said surface being monitored;

a receiver means responsive to said receiver signals during a receive period following said transmit period for separately receiving and storing said receiver signals from each of said transmitter/receiver means in accordance with said ordered phased relationship so that the signals can be combined in phase;

a signal processing means for combining said stored receiver signals to determine the range of said pixel being monitored based on a determination of the two-way sound wave travel time from said combined signal;

a clock signal generator means for generating a clock signal having a selected fixed frequency;

a controller means operable in response to said clock signal for controlling said transmitter and receiver means during said transmit and receive periods to continually scan each of said pixels of said surface so that a plurality of range signal values are generated consecutively corresponding to the range of each pixel of said surface being monitored from said plane of said transmitter/receiver means; and a display means including an imaging processor means responsive to said plurality of range signals for generating a real time display of said surface being monitored.

2. The ultrasonic surface contour mapping system as set forth in claim 1 wherein each of said transmitter/receiver means includes a single piezoelectric transducer and mounting means for mounting said transducers in said single plane above said surface to be monitored in a manner to enhance the direction sensitivity of said ultrasonic energy to and from said surface being monitored.

3. The ultrasonic surface contour mapping system as set forth in claim 1 wherein said transmitter means and said receiver means include a phase delay storage means for storing phase delay values corresponding to the appropriate phase delay to be applied to each of said transmit and received signals for each of said transmitter/receiver means for each of said plurality of pixels of said surface.

4. The ultrasonic surface contour mapping system as set forth in claim 3 wherein said signal processing means includes means for generating an autofocus feedback signal in response to the last determined range value for a particular pixel being scanned and applying said signal to the corresponding ones of said phase delay storage means to update said phase delay values thereby enhancing the dynamic range value determination and to obtain dynamic contour mapping of said surface.

5. The ultrasonic surface contour mapping system as set forth in claim 4 wherein said receiver means includes a first and second signal storage means for alternately storing received signal values during alternate scanning periods and further includes switching means responsive to a control signal from said controller means for switching said first and second signal storage means between a write mode and a read mode during alternate scanning periods so that received signal values can be collected and processed continuously.

6. The ultrasonic surface contour mapping system as set forth in claim 5 wherein each of said phase delay storage means further includes a density value storage means for storing phase compensation values corresponding to the density of the gaseous medium above said surface and applying said phase compensation values to said stored phase values to compensate for changes in velocity of said acoustic energy passing through said gaseous medium based on the density thereof.

7. The ultrasonic surface contour mapping system as set forth in claim 6 wherein said material whose surface is to be monitored is contained within a cylindrical container and wherein each of said transmitter/receiver means includes a single piezoelectric transducer and further includes a cylindrical probe assembly for mounting said transducers in a phased array at a fixed location above said surface and means for directing signals from said transmitter means into said transducers and directing signals out of said transducer into said receiver means.

8. The ultrasonic surface contour mapping system as set forth in claim 7 wherein said imaging processor means further comprises filtering means having a matched response to said combined stored receiver signals for enhancing the range value determination for each of said pixels.

9. The ultrasonic surface contour mapping system as set forth in claim 8 wherein said imaging processor means further comprises a range signal detector means for detecting range signal values exceeding a preselected threshold value so that signals produced by interfering, out-of-focus echoes are eliminated.

10. The ultrasonic surface contour mapping system as set forth in claim 9 wherein said imaging processor means further comprises a peak signal detector means for detecting the peak value of each range signal value for each pixel as said autofocus feedback signal.

11. The ultrasonic surface contour mapping system as set forth in claim 10 further including a calibration/standardization means for calibration/standardization of said range signals and said autofocus signals generated by said signal processing means.

12. The ultrasonic surface contour mapping system as set forth in claim 11 wherein said calibration/standardization means includes a retractable target having a surface area corresponding to one of said pixels and means for selectively positioning said target at a fixed position at a known distance from said probe assembly and above said surface so that said range signal and said autofocus signal values computed by said signal processing means may be calibrated according to the known range of said target.

* * * * *